(12) United States Patent
Choi et al.

(10) Patent No.: US 7,991,214 B1
(45) Date of Patent: Aug. 2, 2011

(54) METHOD TO ENHANCE X-RAY AND OPTICAL IMAGES AND LOCATE NANO-SCALE CRACKS IN ELECTRIC DEVICES AND COMPONENTS

(75) Inventors: Jae H. Choi, Westminster, CO (US); James E. Evans, Brighton, CO (US); Matthew Gilhousen, Westminster, CO (US); Mark D. Woolley, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 1085 days.

(21) Appl. No.: 11/737,026

(22) Filed: Apr. 18, 2007

(51) Int. Cl.
*G06K 9/00* (2006.01)
(52) U.S. Cl. .............. 382/141; 378/4; 250/302
(58) Field of Classification Search ......... 382/145, 382/141
See application file for complete search history.

(56) References Cited

U.S. PATENT DOCUMENTS

| | | | | |
|---|---|---|---|---|
| 3,316,407 A | * | 4/1967 | Ichikawa et al. | 252/478 |
| 3,704,370 A | * | 11/1972 | Shelton | 250/302 |
| 3,818,229 A | * | 6/1974 | Long, Jr. | 252/478 |
| 4,591,478 A | * | 5/1986 | Cohen et al. | 376/253 |
| 7,443,953 B1 | * | 10/2008 | Yun et al. | 378/84 |

FOREIGN PATENT DOCUMENTS

JP 02098655 A * 4/1990

OTHER PUBLICATIONS

Chen, Ying, et al., "Automatic Extraction of Femur Contours from Hip X-ray Images," pp. 1-10.
Hayes, Charles, "The ABC's of Nondestructive Weld Examination," retrieved from http://www.ndt.net/article/0698/hayes/hayes.htm on Feb. 27, 2007, 10 pages.
"X-ray Contrast," retrieved from http://www.mater-imaging.com.au/procedures/xray_contrast.html on Mar. 29, 2007, 2 pages.
Lau, John et al., "HDPUG's Failure Analysis of High-Density Packages' Lead-Free Solder Joints," 11 pages.

* cited by examiner

*Primary Examiner* — Hadi Akhavannik
(74) *Attorney, Agent, or Firm* — Sheridan Ross P.C.

(57) ABSTRACT

The present invention provides an image enhancer that can be applied to various materials during quality testing. The image enhancer is adapted to infiltrate cracks, crevices, fractures, fissures, and other faults, defects, or flaws in the material and provide an increased contrast for images taken by, for example, an X-ray imaging device.

10 Claims, 5 Drawing Sheets

METHOD TO ENHANCE X-RAY AND OPTICAL IMAGES AND LOCATE NANO-SCALE CRACKS IN ELECTRIC DEVICES AND COMPONENTS

FIELD OF THE INVENTION

The invention relates generally to contrast enhancement techniques. More particularly, the invention relates to methods of using image processing techniques to verify the structural integrity of electronic devices.

BACKGROUND

Technologies devoted to the manufacture of electronics and electronic devices from memory devices to microprocessors to computers and cellular phones have seen significant advances. Where most electronic devices are now manufactured in a mass production setting, quality assurance of the manufacturing process plays a vital role in reducing the yield loss in a production process as well as assuring that the number of defective devices released to the public consumer is minimized. While the technologies related to the manufacturing of electronics and electronic devices have seen significant advances, technologies related to the quality assurance and quality checking of such devices have remained somewhat antiquated.

In the electronics industry, a standard quality checking procedure known as the dye-and-pry technique is employed to identify if small cracks or other surface defects have developed in the electronic components themselves as well as solder joints between electronic components. The dye penetrant (dye-and-pry) technique requires first applying a dye to the electronic devices under scrutiny. Samples for the dye impregnation undergo a process that includes, for example: (1) remove flux; (2) immerse sample in Dykem red steel layout fluid; (3) subject the device to a vacuum for 10 minutes (perform this process three times to ensure the dye penetration); (4) remove from vacuum and drip-dry under chemical hood for at least 30 minutes; (5) bake sample for about 30 minutes to remove any residual solvents; and (6) remove samples from the oven and allow to cool to room temperature. The next stage of the process requires carefully prying the electronic devices away from their fixed position on the sample.

After the electronic device has been pried apart from its position, the former electronic connections can be inspected to see if the dye penetrated any surface of the electronic devices or their joints. The existence of dye on an inner surface of the electronic device is an indication that a fault existed prior to prying the electronic device away from its position.

Unfortunately, the dye-and-pry technique is a time consuming and destructive technique that requires the prying of components (e.g., microprocessors, memory devices, and other types of integrated circuits (ICs)), physically and mechanically, away from their respective electronic devices (e.g., a circuit board for a phone, cellular phone, personal digital assistant (PDA), remote email retrieval device, computer, laptop, and so on). Therefore, the dye-and-pry technique makes the location of the origin of the crack almost impossible because it is difficult to distinguish whether the crack developed during the manufacturing of the product or during the prying. Since it is difficult to detect where a crack or surface defect originated, it becomes more difficult to identify the step in the manufacturing process that might have caused the defect. Furthermore, this type of post hoc analysis cannot be used as a quality assurance tool for all products destined for market, because such an analysis results in the destruction of the product. Rather, the dye-and-pry technique can be applied only to a small number of electronic devices that are presumably representative of their entire batch of products.

X-ray examination techniques have also been employed to inspect the quality of electronic devices. However, current X-ray examination techniques are not very useful because traditional X-ray images do not readily show where a defect is located or if a defect exists at all. Furthermore, nano-scale defects may not even be detectable using traditional X-ray examination techniques.

SUMMARY

These and other needs are addressed by various embodiments and configurations of the present invention. The present invention is directed generally to a system, apparatus, and method for enhancing images in order to detect imperfections in electronic devices, components, and joints.

In accordance with at least one embodiment of the present invention, a method of verifying the quality of a product is provided, the method generally comprises:
  receiving a product;
  applying a selected image enhancer to at least a portion of the product;
  capturing an image of the at least a portion of the product that has had the selected image enhancer applied thereto; and
  identifying by the image enhancer, a defect in the product.

It is one aspect of the present invention to utilize an image enhancer in order to highlight areas of potential defects in the product (e.g., sample). The highlighted areas may appear in images that are taken of the product. In accordance with at least one embodiment of the present invention, the images taken of a product may comprise an X-ray image and the potential defects may correspond to darker areas in the image having a non-uniform or irregular shape, as opposed to darker areas having smooth transitions, right angles, or straight lines that would tend to represent a man-made object. One way of automatically identifying such non-uniformity may comprise building a vector or function of the lines that define the edge of the darker area and taking the first and second derivatives of the vector. If both derivatives still correspond to a non-linear vector/function, then the area may be identified as having an irregular or non-uniform shape. In accordance with at least one embodiment of the present invention, the method used to analyze the image may be adapted to identify structural defects in the product by determining that the image comprises a non-uniform collection of pixels having a substantially different pixel value than pixels adjacent to the collection of pixels.

The type of image enhancer employed may also contribute to the identification of defects in the product. More specifically, the image enhancer may be selected to have a good match between the attenuation characteristics and X-ray photon energy of an X-ray tungsten tube. In other words, the type of image enhancer selected may be based upon the composition of the product itself. An image enhancer having a relatively high K edge energy may be used to provide a greater contrast in the image of areas where the image enhancer has infiltrated the product. As contrast between the image enhancer and the product is increased, the difference in pixel values between the image enhancer and the product are increased, thereby making it easier to identify the image enhancer on a captured image.

It is another aspect of the present invention to provide a waterborne image enhancer that includes a metallic substance such as a metallic powder or salt. The waterborne image enhancer may include any matrices containing some water in the volatile-like solvents. The base of the matrices may include the metallic substance that is normally soluble in water and miscible in solvents such as alcohols.

It is still another aspect of the present invention to use an image enhancer to verify the quality of products. Using an image enhancer during such quality assurance testing and failure mode analysis allow products to be analyzed for defects without destroying the product or going through the time and labor-consuming steps of conventional dye-and-pry techniques. Analysis of products without destroying the products allows each product to be analyzed for defects prior to going to market, rather than only being able to analyze a small subset of the products or only being able to analyze products that have already been determined to have a defect by some other testing mechanism. Furthermore, since certain embodiments of the present invention do not require the time-consuming vacuuming and heating tasks of the prior art, the present invention is well suited for use in the production line itself, rather than as a separate process.

In accordance with at least some embodiments of the present invention, an image enhancer is provided for use in verifying the quality of a product by enhancing a contrast in pixel values of an image of a defect in the product the image enhancer comprises:

a metallic substance; and a solvent solution adapted to render the metallic substance in at least one of a solution and dispersion form.

The terms "determine", "calculate", and "compute," and variations thereof, as used herein, are used interchangeably and include any type of methodology, process, mathematical operation or technique.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary imaging system. Although well suited for use with, e.g., a system using an X-ray device, the invention is not limited to use with any particular type of imaging system or configuration of system elements. Those skilled in the art will recognize that the disclosed techniques may be used in any imaging application in which it is desirable to enhance images of objects with the addition of materials to those objects.

The exemplary systems and methods of this invention will also be described in relation to image processing software, modules, and associated imaging hardware. However, to avoid unnecessarily obscuring the present invention, the following description omits well-known structures, system components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein, such as by using conventional and alternative image capture techniques.

Furthermore, while the exemplary embodiments illustrated herein show the various components of the system collocated, it is to be appreciated that the various components of the system can be located at distant portions of a distributed network, such as a communication network and/or the Internet, or within a dedicated secure, unsecured and/or encrypted system. Thus, it should be appreciated that the components of the system can be combined into one or more devices, such as an X-ray machine and associated computing device, or collocated on a particular node of a distributed network.

Figure 1:
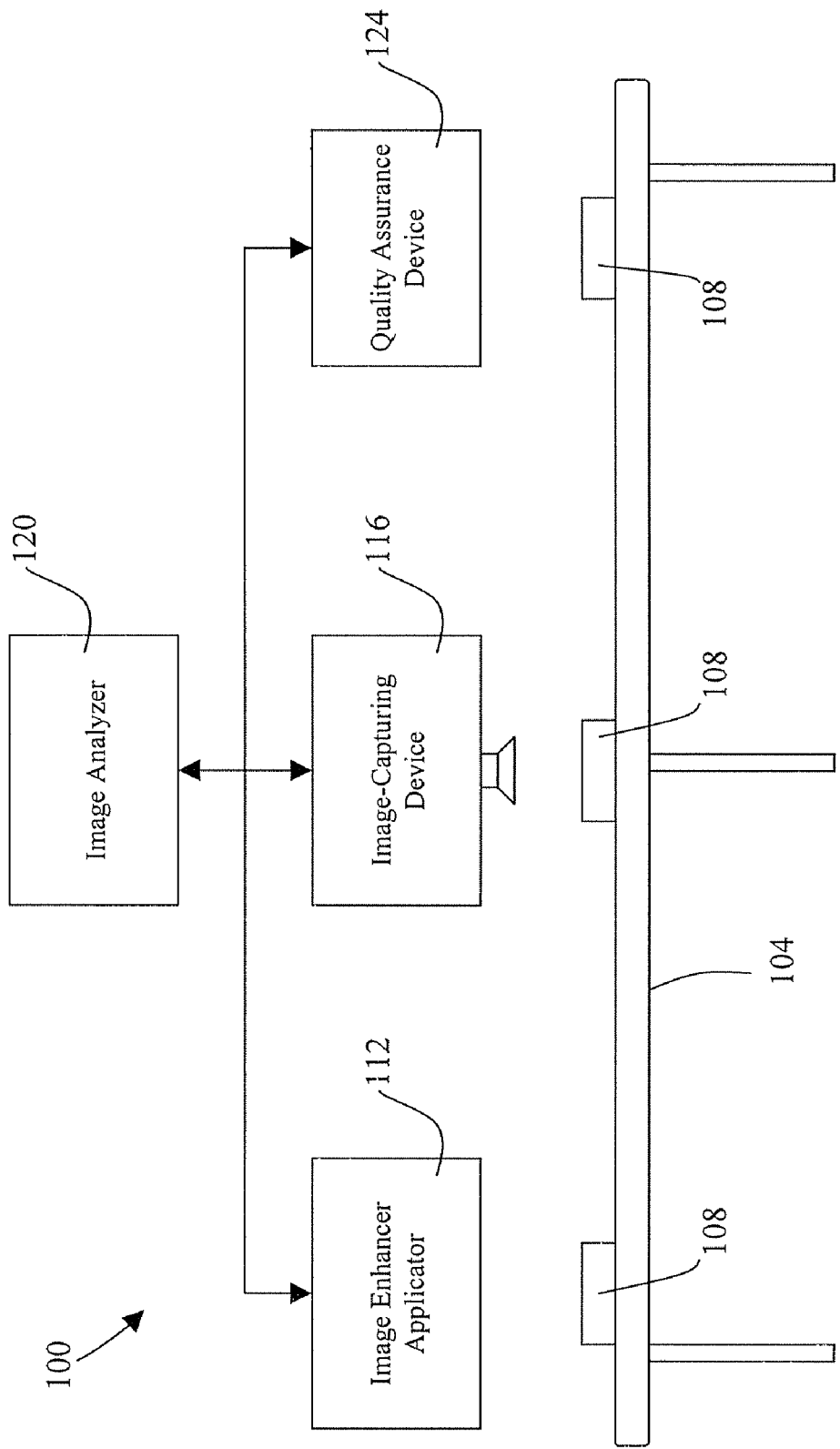
FIG. 1 is a block diagram depicting an imaging system in accordance with embodiments of the present invention.

Referring initially to FIG. 1, an imaging system 100 will be described in accordance with at least some embodiments of the present invention. The imaging system 100 generally comprises a support system 104 for supporting and, optionally, transporting samples 108 between various areas of the imaging system 100. The support system 104 may simply comprise a table, bench, or similar type of inanimate object. Alternatively, the support system 104 may comprise a conveyor system that is adapted to move samples 108 automatically.

The samples 108 that are under scrutiny may comprise any type of material, collection of materials, or component that is to be subjected to a quality assurance test. As an example, the sample 108 may correspond to a multi-layer ceramic capacitor, solder joint, electronic memory device, microprocessor, IC, or any combination thereof alone or residing as a collection of components on a circuit board or in another type of electronic device. The sample 108 may also correspond to any type of material such as plastic, metal, ceramic, or combinations thereof. Additionally, the sample 108 may correspond to a joint or connection between two different materials. Examples of a joint or connection that may be analyzed is a solder joint, weld, or any other connection created between two different objects or materials by a common object or material.

The imaging system 100 may further comprise a number of devices for analyzing the structural integrity of the sample 108. Examples of such devices include, without limitation, an image enhancer applicator 112, an image-capturing device, 116, an image analyzer 120, and a quality assurance device 124. In accordance with at least some embodiments of the present invention, the image enhancer applicator 112 is adapted to apply an image enhancer to the sample 108 such that images taken of the sample 108 can more clearly show defects, if any, in the sample 108. Examples of defects that may be highlighted by the application of an image enhancer include, but are not limited to, crevices, fractures, fissures, and other faults or flaws of a micro-scale or nano-scale size. The image enhancer applicator 112 may be operable to automatically prepare the sample 108 for analysis by first preparing an image enhancer, applying the image enhancer, then removing any excess image enhancer from the sample 108. Alternatively, the functions of the image enhancer applicator 112 may be performed manually by a operator.

The image-capturing device 116 may comprise any type of image capturing device known in the art. In accordance with at least some embodiments of the present invention, the image capturing device 116 may comprise an X-ray or fluoroscope imaging device adapted to utilize X-ray imaging technologies. X-rays may be produced by a high-voltage generator. As the high voltage applied to an X-ray tube is increased, the wavelength of the emitted X-ray becomes shorter, providing the X-rays emitted thereby with more penetrating power. When X-rays are directed at a sample 108, not all of the radiation passes through the sample 108 in the same amount. Different materials, depending upon their density, thickness, and atomic number, will absorb different wavelengths of radiation energy. The differences in materials will result in contrasts in an X-ray image.

The addition of the image enhancer is believed to increase this contrast at defective areas in the sample 108. While not wishing to be bound by any theory, contrast enhancement is believed to result from the photoelectron effect due to high atomic numbers. The photoelectron effect explains the sharp increase in mass attenuation coefficient at the K-shell electron binding energy. Table 1 below shows the atomic number and corresponding K-Shell Electron Binding Energies (K Edge) for selected elements.

TABLE 1

| K Edge Energy by Element | | |
|---|---|---|
| Element | Atomic Number | K Edge Energy |
| I | 53 | 33.2 |
| Ba | 56 | 37.4 |
| Ce | 58 | 40.4 |
| Gd | 64 | 50.2 |
| Tb | 65 | 52.0 |
| Dy | 66 | 53.8 |

TABLE 1-continued

| K Edge Energy by Element | | |
|---|---|---|
| Element | Atomic Number | K Edge Energy |
| Yb | 70 | 61.3 |
| W | 74 | 69.5 |
| Re | 75 | 71.7 |
| Au | 79 | 80.7 |
| Pb | 82 | 88.0 |
| Bi | 83 | 90.5 |

In accordance with certain embodiments of the present invention, the image enhancer is designed to absorb more X-rays than materials around the location(s) where the image enhancer will be applied. For example, if an image is desired for a plastic sample, then an image enhancer having a greater density and therefore greater aptitude to absorb X-rays than the plastic is selected. An image enhancer that is suitable for use with one type of material may not necessarily be optimal for other types of materials, namely because, as the density of the material in the sample 108 varies, the type of image enhancer that is optimal may vary. That is, the image enhancer should be selected to optimize the contrast of images taken of the sample 108. In accordance with some embodiments of the present invention, an optimal image enhancer should have a good match between the attenuation characteristics and X-ray photon energy of an X-ray tungsten tube.

In accordance with at least one embodiment of the present invention, the image enhancer used in X-ray applications may comprise a waterborne or water-soluble composition. The term "waterborne" or "water-soluble", as used herein, is understood to include matrices containing some water in the volatile-like solvents. The base of the matrices may comprise a metallic substance such as a metallic powder or metallic salt, which are normally soluble in water and miscible in solvents such as alcohols (e.g., methyl alcohol, ethyl alcohol, and isopropyl alcohol), methyl ethyl ketone, glycol-ether, and acetone.

The waterborne matrices may comprise metallic powder and metallic salts, flow additives, and a volatile carrier and/or solvent. The metallic powders and metallic salts may comprise elements with high atomic numbers with a corresponding K-Shell electron binding energy of between about 30 to about 100 K edge. Examples of such metallic powders or metallic salts that may be utilized in the image enhancer include, but are not limited to, (I) and (Ba) in the form of potassium iodide, barium iodide hydrate, barium chloride dihydrate, and so on. The metallic powder and salts may exist in solution or dispersion form. In accordance with at least some embodiments of the present invention, the volatile carrier and/or solvent may comprise water alone or with a miscible co-solvent such as various type of alcohols (e.g., methyl alcohol, ethyl alcohol, and isopropyl alcohol), methyl ethyl ketone, glycol-ether, and acetone.

In accordance with alternative embodiments of the present invention, the image-capturing device 116 may comprise other types of image capturing devices such as an optical image capturing device (e.g., black and white or color camera). The image-capturing device 116 should be adapted to capture images of the sample 108 and highlight the contrast provided by the image enhancer applied to the sample 108. More specifically, the image-capturing device 116 should be capable of identifying whether the image enhancer has infiltrated a portion of the sample 108, thereby indicating a fault of defect in the sample 108.

In addition to the image enhancer applicator 112 and the image-capturing device 116, the imaging system 100 may comprise an image analyzer 120. The image analyzer 120 may comprise an automated image analysis routine that can identify the differences in values or color of adjacent pixels of an image captured by the image-capturing device 116. The image analyzer 120 is used to identify whether the applied image enhancer has permeated any defects in the sample 108. Alternatively, the image analyzer 120 may comprise a monitor or similar type of apparatus used by a human operator to view the images captured by the image-capturing device 116. In accordance with at least some embodiments of the present invention, the image analyzer 120 is adapted to utilize image analysis algorithms to identify non-uniform or irregular shapes in the image. For example, if the image captured corresponds to an X-ray image, then the image analyzer 120 may search for darker areas having non-uniform or irregular shapes (e.g., shapes not having a smooth surface, straight edge, right angle, or defined point).

One example of an image analysis algorithm that may be employed by the image analyzer 120 is described in a publication by Chen, et al., entitled "Automatic Extraction of Femur Contours from Hip X-ray Images", the entire contents of which are hereby incorporated herein by this reference. Chen describes an algorithm that implements a model-based approach for automatically extracting femur contours from hip X-ray images. The algorithm works by first detecting prominent features in the image, followed by registration of the model to the X-ray image according to those features. Accordingly, in accordance with certain embodiments of the present invention, a model of the sample 108 may be provided to and maintained by the image analyzer 120, when deviations from a "good" model are detected in an image, then the image analyzer 120 may determine that darker areas of non-uniform shape exist in the image and therefore the subject sample 108 has a defect. In this way, the image analyzer 120 may be used to determine whether a particular sample 108 is defective or not.

Additionally, the image analyzer 120 may be used to determine if the image enhancer being applied to the sample 108 is providing enough contrast to identify if the sample 108 has defects. Accordingly, an information feedback from the image analyzer 120 may be provided to the image enhancer applicator 112. Information received at the image enhancer applicator 112 may be used to fine tune the composition of the image enhancer and optimize the contrast of images captured by the image-capturing device 116. The information may also be used to adjust and optimize the amount of image enhancer applied to each sample 108 as well as the process employed to remove excess image enhancer.

The quality assurance device 124 may be provided in order to remove samples 108 that have been identified as having too many defects as determined by the image analyzer 120. The quality assurance device 124 may also be used to correlate the defective sample 108 as well as the location of the defect on the sample 108 with the production lot from which the sample 108 originated. In other words, the quality assurance device 124 may maintain records of how many samples 108 have been defective and where such defects have historically occurred in the sample 108. This type of information may be used to analyze the sample 108 production process for possible causes of the defects.

The devices of the imaging system 100 may all be employed on a production line such that all products produced are subjected to quality assurance by image analysis. Since the quality assurance method is non-destructive, all products may be scrutinized for quality prior to being sent into the market. Alternatively, the imaging system 100 may be employed to analyze only a select number of products. The products may be selected as a sample 108 randomly or as a result of failing a first quality assurance test. In accordance with certain embodiments of the present invention, samples 108 may correspond to products that have failed a first stage of quality testing and are to be further scrutinized to locate the exact point of failure as well as the possible causes of the defect.

Figure 2:
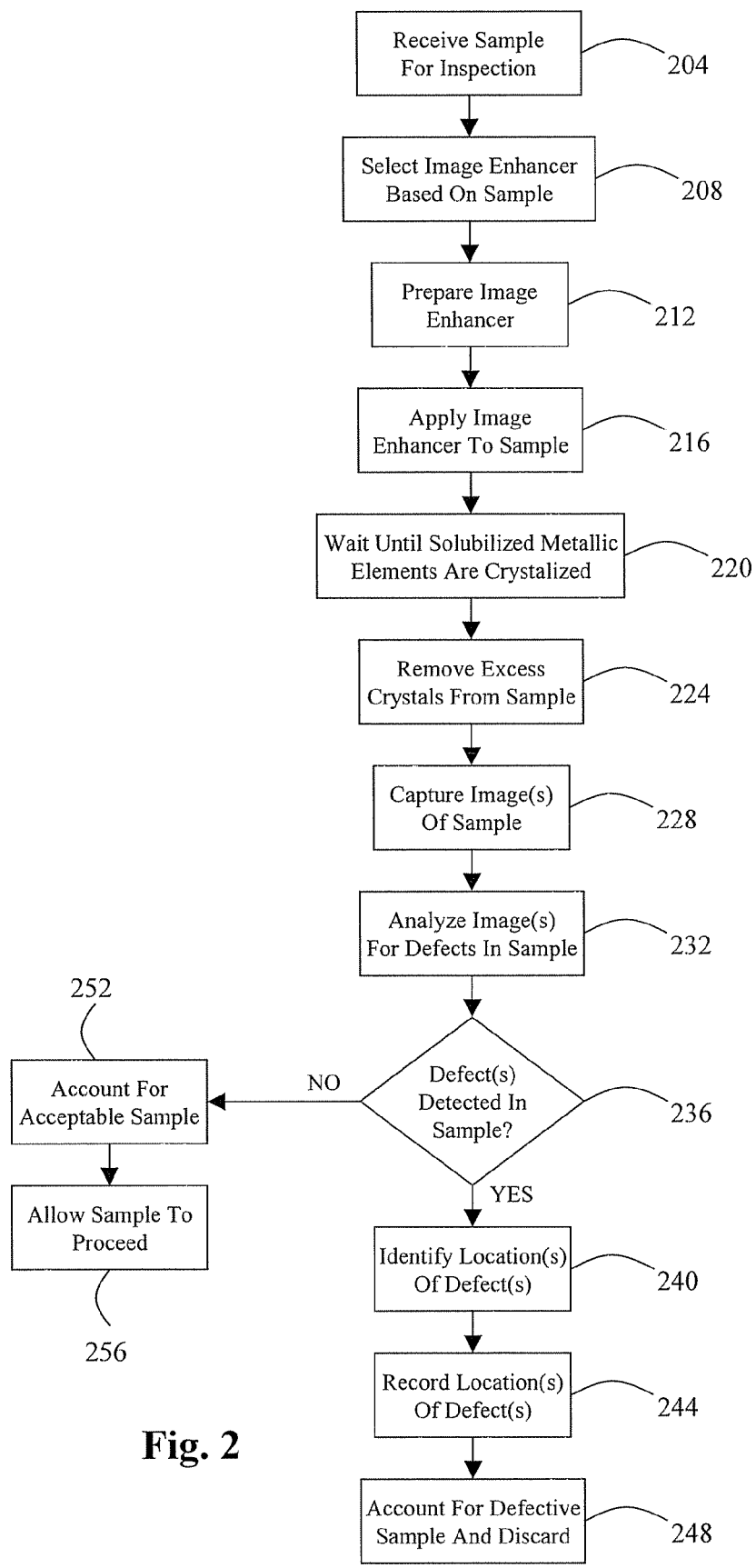
FIG. 2 is a flow diagram depicting a method of assuring product quality in accordance with embodiments of the present invention.

Referring now to FIG. 2, a method of assuring product quality will be described in accordance with at least some embodiments of the present invention. The method begins when a sample 108 is received for inspection (step 204). As noted above, the sample 108 may correspond to a selected sample from a batch of products. Alternatively, each product in the batch of products may be treated as a sample 108. In accordance with some embodiments of the present invention, multiple samples 108 may be analyzed simultaneously although the depicted method is described in relation to analyzing one sample 108 at a time.

After the sample 108 is received, an image enhancer is selected based on the nature of the sample 108 (step 208). Some samples 108 such as plastics and ceramics may require a different type of image enhancer than other samples 108 such as metals and composites. Furthermore, the selection of the image enhancer may depend upon the combination of materials around the area under scrutiny.

Once the appropriate image enhancer has been selected, the image enhancer is prepared (step 212). Following are some non-limiting examples of formulations and methods of preparing image enhancer that may be employed in accordance with certain embodiments of the present invention:

Example 1

A first formulation of an image enhancer may comprise about 5 grams of water, about 5 grams of metallic powder/salts, about 0.05 grams of solid dispersant, about 0.7 grams of amine solubilizer, and about 5 grams of co-solvent. The metallic powder and metallic salts may be granules or powder having the K-Shell electron binding energy of from about 30 to about 100 K edge. The solid dispersant may be used to eliminate or minimize settling of powder or granulates before and after complete dissolution. One example of a solid dispersant that may be used comprises an anionic surfactant (surface reactive agent) such as Vasperse 1 from VATAN KIMYA or Tamol731 from Rohm & Haas. The amine solubilizer may comprise a highly efficient co-dispersant that improves the stability of the viscosity. Examples of a suitable amine solubilizer include, without limitation, amino alcohol and 2-methyl-propanol (AMP) from ANGUS Chemical. The co-solvent may comprise, for example, methyl alcohol, ethyl alcohol, isopropyl alcohol, methyl ethyl ketone, glycol ether and/or acetone.

During the compounding process, the metallic powder or metallic salt is dissolved with water and a portion of the vehicle such as co-solvent. Dissolution can be achieved by paddle, shaker, and/or tumbler methods, which are known in the art. After dissolution of the metallic powder or metallic salt in the water and co-solvent, the remaining materials of the image enhancer are added.

Example 2

A second formulation of an image enhancer may comprise about 10 grams of water, about 10 grams of metallic powder/salts, about 0.1 grams of solid dispersant, about 1.0 grams of amine solubilizer, and about 10 grams of co-solvent. The metallic powder and metallic salts may be granules or powder having the K-Shell electron binding energy of from about 30 to about 100 K edge. The solid dispersant may be used to eliminate or minimize settling of powder or granulates before and after complete dissolution. One example of a solid dispersant that may be used comprises an anionic surfactant (surface reactive agent) such as Vasperse 1 from VATAN KIMYA or Tamol731 from Rohm & Haas. The amine solubilizer may comprise a highly efficient co-dispersant that improves the stability of the viscosity. Examples of a suitable amine solubilizer include, without limitation, amino alcohol and 2-methyl-propanol (AMP) from ANGUS Chemical. The co-solvent may comprise, for example, methyl alcohol, ethyl alcohol, isopropyl alcohol, methyl ethyl ketone, glycol ether and/or acetone.

During the compounding process, the metallic powder or metallic salt is dissolved with water and a portion of the vehicle such as co-solvent. Dissolution can be achieved by paddle, shaker, and/or tumbler methods, which are known in the art. After dissolution of the metallic powder or metallic salt in the water and co-solvent, the remaining materials of the image enhancer are added.

Example 3

A third formulation of an image enhancer may comprise about 20 grams of water, about 20 grams of metallic powder/salts, about 0.2 grams of solid dispersant, about 1.2 grams of amine solubilizer, and about 13 grams of co-solvent. The metallic powder and metallic salts may be granules or powder having the K-Shell electron binding energy of from about 30 to about 100 K edge. The solid dispersant may be used to eliminate or minimize settling of powder or granulates before and after complete dissolution. One example of a solid dispersant that may be used comprises an anionic surfactant (surface reactive agent) such as Vasperse 1 from VATAN KIMYA or Tamol731 from Rohm & Haas. The amine solubilizer may comprise a highly efficient co-dispersant that improves the stability of the viscosity. Examples of a suitable amine solubilizer include, without limitation, amino alcohol and 2-methyl-propanol (AMP) from ANGUS Chemical. The co-solvent may comprise, for example, methyl alcohol, ethyl alcohol, isopropyl alcohol, methyl ethyl ketone, glycol ether and/or acetone.

During the compounding process, the metallic powder or metallic salt is dissolved with water and a portion of the vehicle such as co-solvent. Dissolution can be achieved by paddle, shaker, and/or tumbler methods, which are known in the art. After dissolution of the metallic powder or metallic salt in the water and co-solvent, the remaining materials of the image enhancer are added.

After the image enhancer has been properly prepared, the image enhancer is applied to the sample 108 (step 216). The application of the image enhancer may be performed via an automated mechanism such as the image enhancer applicator 112 or manually by a system operator acting as the image enhancer applicator. The image enhancer may be applied by pipette or by a hypodermic syringe onto an area under scrutiny. The area of scrutiny may correspond to an area of the sample 108 that failed a previous quality test, an area that is known to have a higher level of defects, or a randomly selected area of the sample 108. Alternatively, the image enhancer may be applied to the entirety of the sample 108.

Once the image enhancer has been applied, the method continues by waiting until the solubilized metallic elements of the image enhancer have crystallized (step 220). The crystallization of the metallic elements (e.g., the metallic powder/salts) may be indicated by the image enhancer's lack of ability to flow. Alternatively, this step may be performed by waiting a predetermined amount of time after the image enhancer has been applied to the sample 108.

When the metallic elements of the image enhancer have crystallized, the method continues by removing the excess crystals from the sample 108 (step 224). In this step, the excess crystals may be wiped by a clean cloth, cotton swab or wire brush. The surface of the sample 108 is cleaned of the crystals such that any remaining crystals on the sample 108 are residing in cracks or other surface defects of the sample 108. This allows the image enhancer to reside only in areas that are to be contrasted relative to the rest of the sample 108. One advantageous aspect of the present invention is that no vacuum techniques, predetermined drying times, or temperatures are required for the preparation of the sample 108. Rather, the sample 108 can be prepared with the image enhancer in a relatively quick and short series of steps that include applying the image enhancer and wiping any excess image enhancer (e.g., metallic crystals) from the surface of the sample 108. The quick nature of the sample 108 preparation allows the sample 108 to be prepared and possibly scrutinized as a part of the production process.

Upon removal of the excess crystals from the sample 108, the method continues with the image-capturing device 116 capturing at least one image of the sample 108 (step 228). As noted above the image may comprise an X-ray image or collection of X-ray images. In accordance with certain embodiments, the X-ray image is taken with an X-ray device utilizing between about 50 kV and about 150 kV at about 5 uA to about 60 uA. The intensity and amount of X-rays utilized to capture the image may vary depending upon the density and size of the sample 108 around the area of interest. The images may also be taken using a fluoroscope that is adapted to capture a series of X-ray images of the sample 108. Other types of images may be captured of the sample 108 in addition to the X-ray images or in substitution of the X-ray images. The other types of images that may be taken include normal pictures, high definition pictures, video images, Gamma ray images, magnetic resonance images, ultrasonic images, ultraviolet images, infrared images, and other types of images known in the art.

After the image or images of the sample 108 have been captured, the image analyzer 120 analyzes the images for defects in the sample 108 (step 232). Defects may be indicated by an infiltration of the image enhancer in the sample 108. The infiltration of the image enhancer may be depicted as a darker area or line as compared to the surrounding area of the sample 108. If the image enhancer was able to infiltrate beneath the surface of the sample 108, the metallic crystals may have been able to grow and crystallize beneath the surface of the sample. An image of a sample 108 showing a greater contrast between adjacent pixel values than normal may indicate that the sample 108 has a defect.

Thereafter, it is determined if the sample 108 has any defects that have been infiltrated and illuminated by the image enhancer (step 236). As noted above, this analysis may be qualitatively performed by a human operator or may be automatically performed by an image analysis routine. In accordance with certain embodiments of the present invention, thresholds for contrast differences and shapes of contrast differences may be defined for a normal image that does not show any defects in the sample 108. If the image analysis routine determines that adjacent pixels of an image under analysis have a greater contrast in a shape that is not predefined, then the image analyzer 120 may determine that the sample 108 has a defect. The size of defects detected by the image analyzer 120 may vary from the scale of micrometers to nanometers.

In the event that the sample 108 is determined to have a defect, the image analyzer 120 identifies the location or locations of the defect(s) (step 240). The location of the defect may be defined to a relatively large granularity, such as by defining that the sample 108 has a defect. Alternatively, the granularity of the location of the defect may be defined with more precision, such as by defining the exact electrical connection that comprises a defect or by defining the area of interest that had the image enhancer applied thereto.

After the location of the defect has been identified, the quality assurance device 124 records the location of the defect (step 244). In addition to recording the location of the defect, the quality assurance device 124 may also correlate the defect to the lot of origin of the sample. In other words, the quality assurance device 124 may determine which lot or batch of products the sample 108 came from. This information can then be used to request that more products from the same batch be analyzed or to update the defect rate for that particular batch. Once the location of the defect has been recorded, the quality assurance device 124 may account for the defective sample 108 and discard or remove the sample from the production line (step 248). At this point the sample 108 may be thrown away or set back through production to be repaired, if possible.

Referring back to step 236, in the event that the sample 108 does not have any defects, or at least no defects were detected by the imaging system 100, the method continues with the quality assurance device 124 accounting for the acceptable sample 108 (step 252). The number of good and bad samples 108 may be of interest, because if the number of defective samples from a batch exceeds a predetermined threshold, then the quality assurance device 124 may generate an automatic notification to authorized personnel. In response to receiving such a notification, the authorized personnel may order the recall of a particular batch of products or require that more samples from a particular batch be taken for quality testing. Once the good sample 108 has been accounted for, the method continues by allowing the sample 108 to proceed through the production line (step 256).

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

Figure 3:
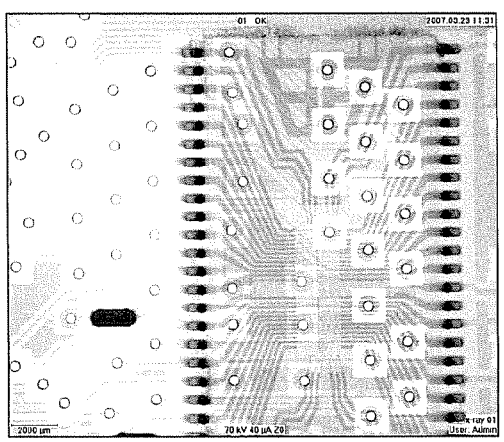
FIG. 3 is a first exemplary X-ray image taken of a memory device untreated by an image enhancer.

Referring now to FIGS. 3-12 a number of exemplary X-ray images used to determine if a sample 108 has a defect will be described in accordance with at least some embodiments of the present invention. FIG. 3 depicts an X-ray image of an electronic memory device that has not been treated with an image enhancer for reference. The setting of the X-ray image-capturing device 116 used to capture FIG. 3 is about 70 kV at about 40 uA. As can be seen in FIG. 3, the ability to detect nano-scale defects in the sample 108 is limited due to the lack of contrast of the defects as compared to the rest of the sample 108. The only areas of significant contrast between adjacent pixel values correspond to the solder bumps where the leads of the memory device connect to the circuit board.

Figure 4:
FIG. 4 is a second exemplary X-ray image taken of a plurality of leads treated with an image enhancer in accordance with embodiments of the present invention.

FIG. 4 depicts an up close X-ray image of broken leads. The defects in the leads have been treated and subsequently infiltrated by the image enhancer. The setting of the X-ray image-capturing device 116 used to capture FIG. 4 is about 60 kV at about 50 uA. The areas of infiltration can be seen as the semi-circular bulges around the point where the leads connect to the upper dark material. This infiltration is an indication that a surface defect exists around the leads.

Figure 5:
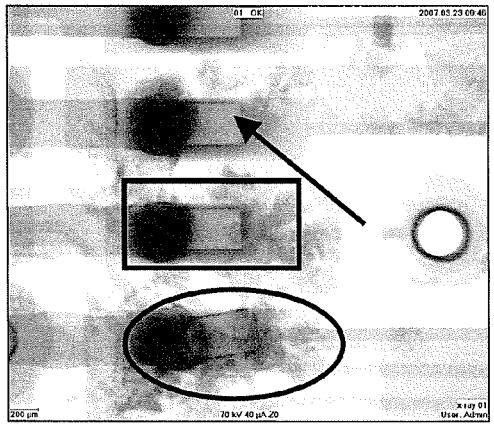
FIG. 5 is a third exemplary X-ray image taken of a plurality of leads treated with an image enhancer in accordance with embodiments of the present invention.

FIG. 5 depicts an X-ray image of three leads, two of which have defects. The setting of the X-ray image-capturing device 116 used to capture FIG. 5 is about 70 kV at about 40 uA. The lead having the arrow point thereto is not displaying any evidence of image enhancer infiltration. Accordingly, that particular lead can be deemed good. The lead surrounded by the rectangle shows some infiltration. The dark area on the left of the lead corresponds to the point of application of the image enhancer. However, there is evidence of image enhancer all around the lead as small clouds of contrast. The irregular shape of the dark area around the lead is an indication that the image enhancer has had at least some infiltration of the sample 108. The lead surrounded by the rectangle may possibly comprise an edge crack or similar type of small surface defect. The lowest lead surrounded by the ellipse shows evidence of significant infiltration. Again, the darkest point on the left of the lead corresponds to the point of application of the image enhancer, but crystals can be seen in the image all around the lead. The darker cloud regions surrounding the lead are an indication that there has been significant infiltration of the image enhancer and the corresponding lead most likely has a crack.

Figure 6:
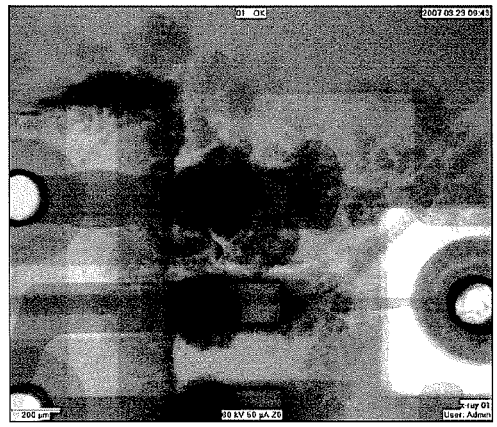
FIG. 6 is a fourth exemplary X-ray image taken of a plurality of leads treated with an image enhancer in accordance with embodiments of the present invention.

FIG. 6 depicts an X-ray image of two leads of a memory device, both of which have some defects. The setting of the X-ray image-capturing device 116 used to capture FIG. 6 is about 60 kV at about 50 uA. The highest lead in FIG. 6 displays signs of significant infiltration. The darkest area on the left of the lead corresponds to the point of application of the image enhancer, but as can be seen the image enhancer has spread all around the lead. The infiltrated areas display areas of contrast having irregular shapes (e.g., shapes with non-uniform edges and right angles). The lower lead also shows some signs of infiltration on the right side of the lead. This minor crystal growth under the surface of the sample 108 indicates that a surface defect existed on the sample 108. The size of the defect may not be as large as the defect of the higher lead.

Figure 7:
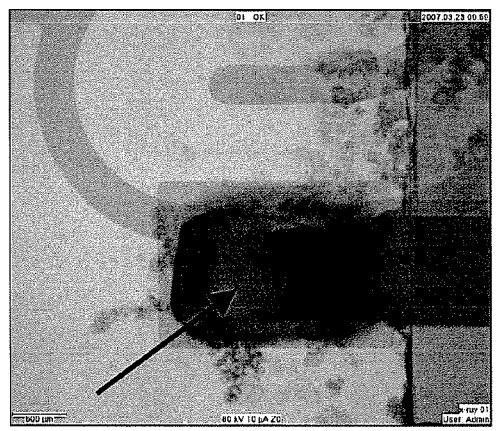
FIG. 7 is a fifth exemplary X-ray image taken of a defective lead treated with an image enhancer in accordance with embodiments of the present invention.

FIG. 7 depicts an X-ray image of a single defective lead. The setting of the X-ray image-capturing device 116 used to capture FIG. 7 is about 80 kV at about 10 uA. As can be seen in FIG. 7, there is some dendrite (crystal) growth beneath the pad of the lead. The growth of crystals beneath the pad shows that the image enhancer reached beneath the surface of the sample 108 due to some type of surface defect.

Figure 8:
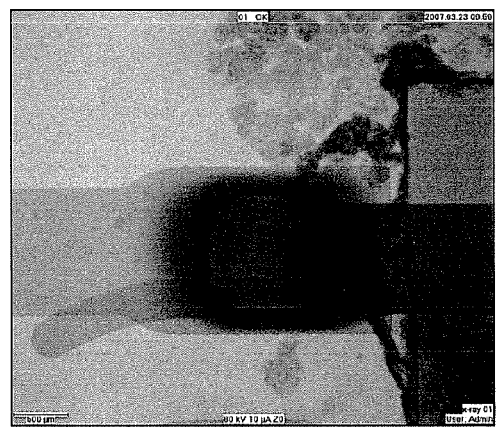
FIG. 8 is a sixth exemplary X-ray image taken of a good lead treated with an image enhancer in accordance with embodiments of the present invention.

As a point of comparison, FIG. 8 depicts an X-ray image of a single non-defective lead. The setting of the X-ray image-capturing device 116 used to capture FIG. 8 is approximately the same setting as was used to capture FIG. 7. In contrast to FIG. 7, FIG. 8 shows no signs of infiltration. The only point of significant contrast corresponds to the lead itself and the point where the image enhancer was applied. The lack of irregularly shaped areas of contrast is an indication that the lead is free from defects.

Figure 9:
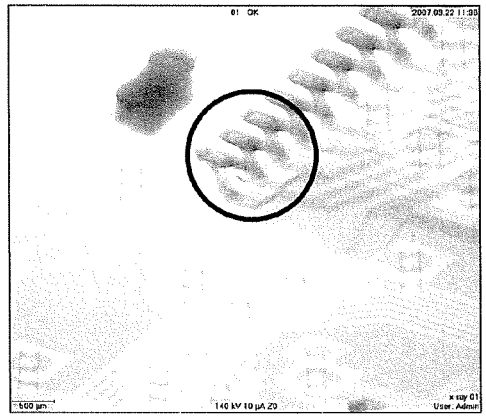
FIG. 9 is a seventh exemplary X-ray image taken of lifted memory leads untreated by an image enhancer.

FIG. 9 depicts an X-ray image of lifted leads of a memory device without any image enhancer applied thereto. The setting of the X-ray image-capturing device 116 used to capture FIG. 9 is about 140 kV at about 10 uA. The failure to use the image enhancer makes the task of identifying defects in the sample 108 very difficult.

Figure 10:
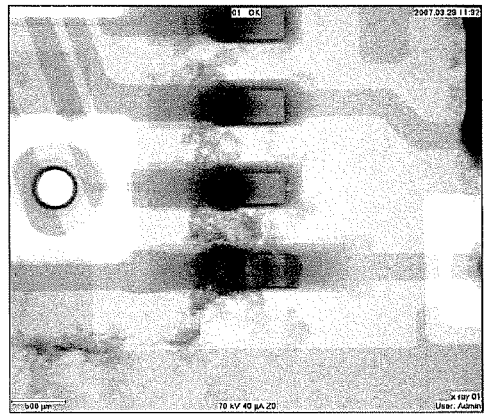
FIG. 10 is an eighth exemplary X-ray image taken of lifted memory leads treated with an image enhancer in accordance with embodiments of the present invention.
Figure 11:
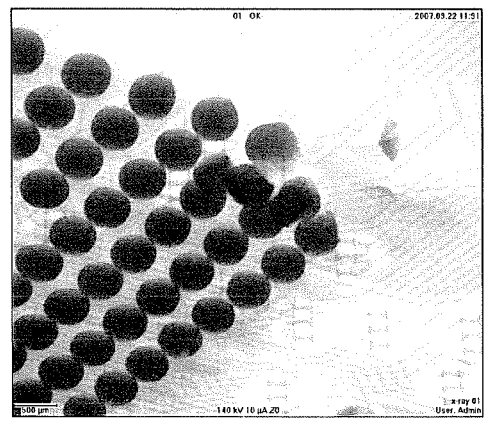
FIG. 11 is a ninth exemplary X-ray image taken of a ball grid array untreated by an image enhancer.

FIG. 10 depicts an X-ray image of the lifted leads of the same memory device of FIG. 9, but with the leads treated with an image enhancer. The setting of the X-ray image-capturing device 116 used to capture FIG. 10 is about 70 kV at about 40 uA. The lowest lead in FIG. 10 shows signs of image enhancer infiltration. The dark and cloudy area around the lowest leads is an indication that that particular lead is cracked, a defect that was difficult if not impossible to detect in FIG. 9. The rest of the leads do not have any signs of image enhancer infiltration and may therefore be considered of good quality FIG. 11 depicts an X-ray image of a ball grid array (BGA) that has not been treated with an image enhancer. The setting of the X-ray image-capturing device 116 used to capture FIG. 11 is about 140 kV at about 20 uA. As with FIG. 9, the ability to detect defects in the sample 108 is difficult without the use of the image enhancer.

Figure 12:
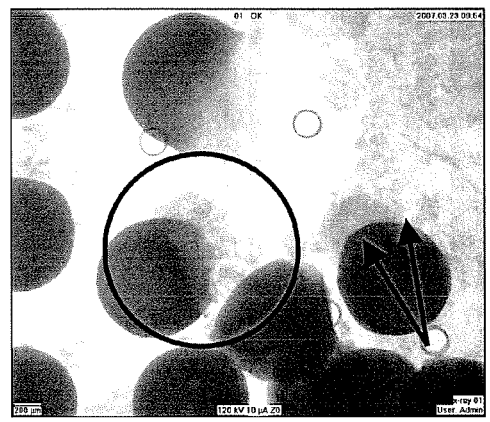
FIG. 12 is a tenth exemplary X-ray image taken of a ball grid array treated with an image enhancer in accordance with embodiments of the present invention.

FIG. 12, on the other hand, depicts an X-ray image of the BGA, but after treatment with the image enhancer. The setting of the X-ray image-capturing device 116 used to capture FIG. 12 is about 120 kV at about 10 uA. The application of the image enhancer helps to show the surface defects of the BGA. More specifically, the clouded dark areas surrounded by the circle and pointed at by the arrows show that the image enhancer has penetrated the surface of the sample 108 and some crystal formation has occurred. The formation of crystals is evidenced by the X-ray images and can be used to show that a defect exists in the sample 108, without employing destructive analytical techniques such as the dye-and-pry technique.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of verifying the quality of a product, comprising:
    receiving a product comprising at least one of a plastic and a ceramic;
    applying a selected image enhancer to at least a portion of the product, wherein the selected image enhancer is configured to absorb more X-rays than the at least one of plastic and ceramic of the product, wherein applying comprises utilizing a syringe or pipette to apply the selected image enhancer to the product;
    after applying the image enhancer to the at least a portion of the product and prior to capturing the X-ray image, allowing the image enhancer to crystallize; and
    removing excess crystals from a surface of the product prior to capturing an X-ray image of the at least a portion of the product;
    capturing the X-ray image of the at least a portion of the product that has had the selected image enhancer applied thereto; and
    identifying by the image enhancer, a defect in the product.

2. The method of claim 1, wherein the determining step comprises identifying an area of contrast having a non-uniform shape.

3. The method of claim 1, wherein capturing the image comprises utilizing an X-ray image-capturing device.

4. The method of claim 3, wherein the X-ray image-capturing device is operated between about 50 kV and about 150 kV at about 5 uA to about 60 uA.

5. The method of claim 1, wherein the image enhancer comprises a waterborne composition comprising at least some water and at least one of a metallic powder and salt.

6. The method of claim 5, wherein the at least one of a metallic powder and salt comprises elements with a K-shell electron binding energy between about 30 and about 100 K edge.

7. The method of claim 6, wherein the at least one of a metallic powder and salt comprises Barium in the form of at least one of barium iodide hydrate and barium chloride dihydrate.

8. The method of claim 1, wherein the image enhancer comprises at least one of water, a metallic powder, a metallic salt, a solid dispersant, an amine solubilizer, and a co-solvent.

9. The method of claim 8, wherein the image enhancer comprises at least one of the metallic powder and metallic salt in at least one of solution and dispersion form.

10. The method of claim 1, wherein applying the image enhancer comprises utilizing at least one of a pipette, a hypodermic syringe, and automated dispenser to apply the image enhancer to the at least a portion of the product.

* * * * *

UNITED STATES PATENT AND TRADEMARK OFFICE
CERTIFICATE OF CORRECTION

| | | |
|---|---|---|
| PATENT NO. | : 7,991,214 B1 | Page 1 of 1 |
| APPLICATION NO. | : 11/737026 | |
| DATED | : August 2, 2011 | |
| INVENTOR(S) | : Choi et al. | |

It is certified that error appears in the above-identified patent and that said Letters Patent is hereby corrected as shown below:

Title of the application, front page: Delete "electric" and insert --electronic--.

Signed and Sealed this
Thirty-first Day of July, 2012

David J. Kappos
*Director of the United States Patent and Trademark Office*